US012603023B2

(12) United States Patent　　　　　(10) Patent No.:　US 12,603,023 B2
Chang et al.　　　　　　　　　　　　(45) Date of Patent:　　　Apr. 14, 2026

(54) LIGHT MODULATION FOR FOVEATED DISPLAY

(71) Applicant: Meta Platforms Technologies, LLC, Menlo Park, CA (US)

(72) Inventors: Kai-Han Chang, Troy, MI (US); Yu-Jen Wang, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/640,817

(22) Filed: Apr. 19, 2024

(65) Prior Publication Data

US 2024/0363040 A1　　　Oct. 31, 2024

Related U.S. Application Data

(60) Provisional application No. 63/462,610, filed on Apr. 28, 2023.

(51) Int. Cl.
　　*G09G 3/00*　　　　(2006.01)
　　*G02F 1/29*　　　　(2006.01)
　　*G06F 3/01*　　　　(2006.01)
(52) U.S. Cl.
　　CPC ............. *G09G 3/001* (2013.01); *G02F 1/292* (2013.01); *G06F 3/013* (2013.01); *G09G 2340/0407* (2013.01); *G09G 2354/00* (2013.01)
(58) Field of Classification Search
　　CPC . G06F 3/013; G02F 1/292; G09G 2340/0407; G09G 2354/00; G09G 3/001
　　See application file for complete search history.

(56) References Cited

U.S. PATENT DOCUMENTS

| | | | |
|---|---|---|---|
| 9,857,593 B2 | 1/2018 | Hong et al. | |
| 9,977,251 B2 | 5/2018 | Cho et al. | |
| 10,359,845 B1* | 7/2019 | Sulai ..................... | G06F 1/163 |
| 10,670,928 B2 | 6/2020 | Shi et al. | |
| 10,935,794 B1 | 3/2021 | Amirsolaimani et al. | |
| 11,238,836 B2 | 2/2022 | Mathur et al. | |
| 11,249,365 B2 | 2/2022 | Shipton et al. | |
| 11,294,184 B2 | 4/2022 | Lu et al. | |
| 11,435,577 B2 | 9/2022 | Balachandreswaran | |
| 11,435,821 B2 | 9/2022 | Wang et al. | |
| 11,531,244 B2 | 12/2022 | Oh et al. | |
| 2016/0379606 A1* | 12/2016 | Kollin ................. | G03H 1/2294 |
| | | | 345/428 |
| 2019/0318677 A1 | 10/2019 | Lu et al. | |
| 2021/0208397 A1 | 7/2021 | Lu et al. | |

OTHER PUBLICATIONS

International Search Report and Written Opinion for International Application No. PCT/US2024/026461, mailed Aug. 7, 2024, 11 pages.
Wang Y., et al., "Varifocal Augmented Reality Adopting Electrically Tunable Uniaxial Plane-Parallel Plates," Optics Express, Jul. 20, 2020, vol. 28, No. 15, pp. 23023-23036.
International Preliminary Report on Patentability for International Application No. PCT/US2024/026461, mailed Nov. 6, 2025, 8 pages.

* cited by examiner

*Primary Examiner* — Matthew A Eason
*Assistant Examiner* — Scott D Au
(74) *Attorney, Agent, or Firm* — Greenberg Traurig, LLP

(57)　　　　　　　ABSTRACT

Gaze data of a user is received. A display zone corresponding to the gaze data is identified. The display zone is a portion of a display pixel array. The display light generated by the display zone is modulated to shift an optical path of the display light within the display zone.

20 Claims, 14 Drawing Sheets

310

| 313A | 313B | 313C | 313D |
| 313E | 313F | 313G | 313H |
| 313I | 313J | 313K | 313L |
| 313M | 313N | 313O | 313P |

320

| 323A | 323B | 323C | 323D |
| 323E | 323F | 323G | 323H |
| 323I | 323J | 323K | 323L |
| 323M | 323N | 323O | 323P |

MODULATING DISPLAY LIGHT TO INCREASE PERCEIVED RESOLUTION

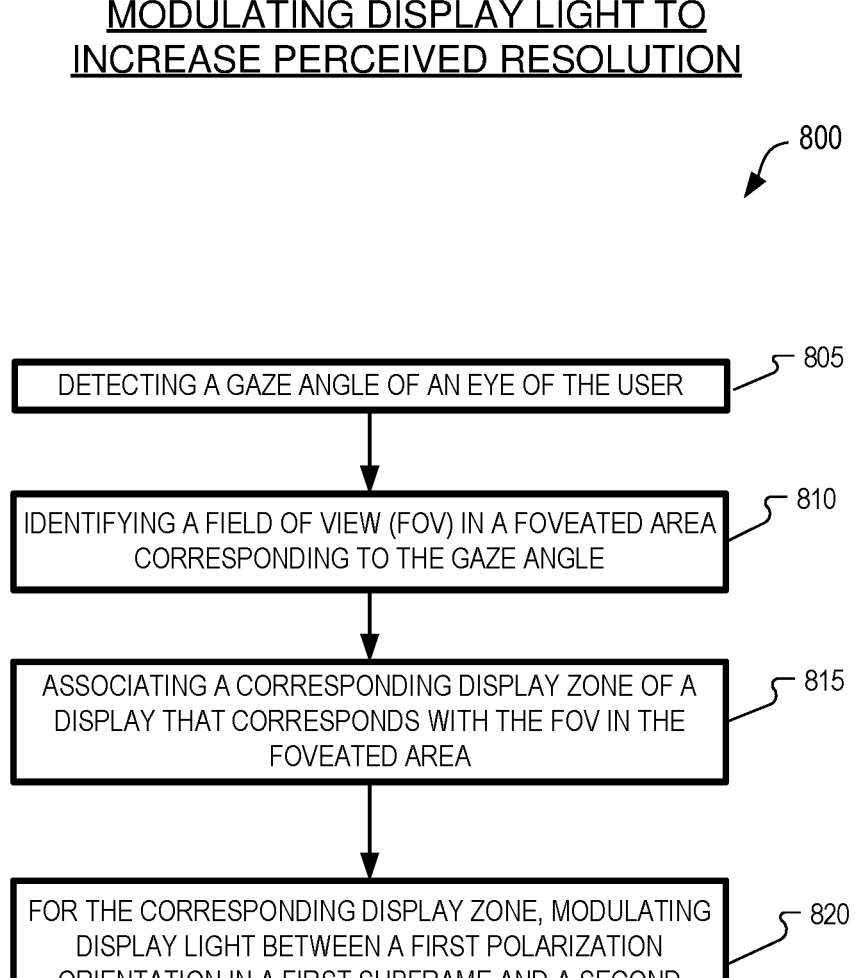

800

DETECTING A GAZE ANGLE OF AN EYE OF THE USER — 805

IDENTIFYING A FIELD OF VIEW (FOV) IN A FOVEATED AREA CORRESPONDING TO THE GAZE ANGLE — 810

ASSOCIATING A CORRESPONDING DISPLAY ZONE OF A DISPLAY THAT CORRESPONDS WITH THE FOV IN THE FOVEATED AREA — 815

FOR THE CORRESPONDING DISPLAY ZONE, MODULATING DISPLAY LIGHT BETWEEN A FIRST POLARIZATION ORIENTATION IN A FIRST SUBFRAME AND A SECOND POLARIZATION IN A SECOND SUBFRAME — 820

FIG. 8

LIGHT MODULATION FOR FOVEATED DISPLAY

CROSS-REFERENCE TO RELATED APPLICATIONS

This application claims priority to U.S. provisional Application No. 63/462,610 filed Apr. 28, 2023, which is hereby incorporated by reference.

TECHNICAL FIELD

This disclosure relates generally to optics, and in particular to displays.

BACKGROUND INFORMATION

Display design commonly balances the tradeoffs between pixel size, light efficiency, and cost. When the quantum efficiency of a display drops, power consumption increases, which limits the contexts that the display can be deployed. Additionally, for displays with smaller form factors, the glass etching capability may be limited to a pixel pitch in the microns.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 illustrates display zones of an example display and zones of an example pixel dithering optical component, in accordance with aspects of the disclosure.

FIG. 8 illustrates an example flow chart for a process of modulating display light to increase perceived resolution of a display, in accordance with aspects of the disclosure.

DETAILED DESCRIPTION

Figure 1:
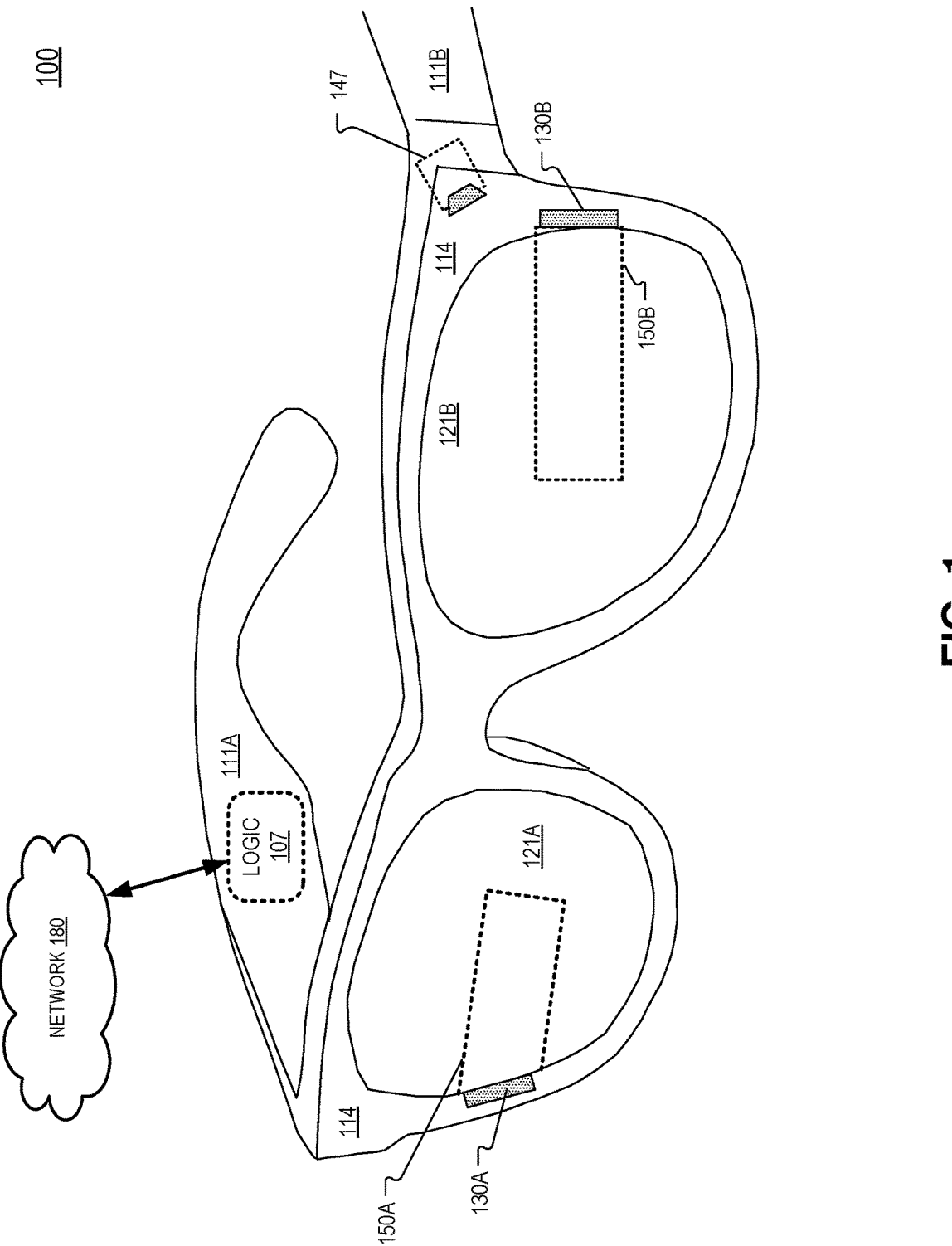
FIG. 1 illustrates a head mounted display (HMD) that may include a near-eye display that increases a perceived resolution of the display for one or more display zones that are emitting the display light that the viewer is viewing, in accordance with aspects of the disclosure.

Embodiments of light modulation for a foveated display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

For small form-factor displays with high resolution, the tradeoff between small pixel size, light efficiency, and cost is challenging. Head-mounted displays are an example of a context that requires small-form factor displays. The human eye is generally considered to be able to see 60 Pixel PerDegree (PPD), at least in the center foveal region of the eye. Hence, a small form-factor display that can provide 60 PPD is desirable.

In implementations of the disclosure, display light modulation between sub-frames of an image is used to increase the perceived resolution of portions of the display corresponding to a gaze angle of the eye. In an implementation, a head-mounted display includes an eye-tracking system, a display, and a pixel dithering optical component to modulate the display light emitted from display zones corresponding to the gaze angle of the eye.

The eye-tracking system may determine a gaze angle of the eye of a wearer of the head-mounted display and a field of view (FOV) corresponding to the gaze angle is identified. A corresponding display zone of the display that generates the display light that is directed to the FOV is identified. A portion of the display light that is directed to the FOV is modulated between sub-frames to increase the perceived resolution of the display. The pixel dithering optical component may have zones corresponding with display zones so that the zones of the pixel dithering optical component can modulate the display light of one or more zones of the display associated with the FOV that a user is gazing at. In one of the subframes, the display light of a particular display zone may be modulated so that the optical path is shifted. In the other subframe, the optical path is unshifted. The shifted display light in the first subframe time-multiplexed with the unshifted display light in the second subframe combine to provide the appearance of doubling the resolution of the display zone associated with the gaze angle of the eye. These and other embodiments are described in more detail in connection with FIGS. 1-8.

FIG. 1 illustrates a head mounted display (HMD) 100 that may include a near-eye display that increases a perceived resolution of the display for one or more display zones that are emitting the display light that the viewer is viewing, in accordance with aspects of the present disclosure. HMD 100 includes frame 114 coupled to arms 111A and 111B. Lens assemblies 121A and 121B are mounted to frame 114. Lens assemblies 121A and 121B may include a prescription lens matched to a particular user of HMD 100. The illustrated HMD 100 is configured to be worn on or about a head of a wearer of HMD 100.

In the HMD 100 illustrated in FIG. 1, each lens assembly 121A/121B includes a waveguide 150A/150B to direct display light generated by displays 130A/130B to an eyebox area for viewing by a user of HMD 100. Displays 130A/130B may include a beam-scanning display or a liquid crystal on silicon (LCOS) display for directing display light to a wearer of HMD 100 to present virtual images, for example.

Lens assemblies 121A and 121B may appear transparent to a user to facilitate augmented reality or mixed reality to enable a user to view scene light from the environment around them while also receiving display light directed to their eye(s) by, for example, waveguides 150. Lens assemblies 121A and 121B may include two or more optical layers for different functionalities such as display, eye-tracking, and optical power. In some embodiments, display light from display 130A or 130B is only directed into one eye of the wearer of HMD 100. In an embodiment, both displays 130A and 130B are used to direct display light into waveguides 150A and 150B, respectively.

Frame 114 and arms 111 may include supporting hardware of HMD 100 such as processing logic 107, a wired and/or wireless data interface for sending and receiving data, graphic processors, and one or more memories for storing data and computer-executable instructions. Processing logic 107 may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel. Processing logic 107 may be communicatively coupled to a network 180 to provide data to network 180 and/or access data within network 180. The communication channel between processing logic 107 and network 180 may be wired or wireless.

In the illustrated implementation of FIG. 1, HMD 100 includes a camera 147 configured to image an eyebox region. In some implementations, an illumination module (not illustrated) may illuminate the eyebox region with near-infrared illumination light to assist camera 147 in imaging the eyebox region for eye-tracking purposes. Camera 147 may include a lens assembly configured to focus image light to a complementary metal-oxide semiconductor (CMOS) image sensor, in some implementations. A near-infrared filter that receives a narrow-band near-infrared wavelength may be placed over the image sensor so it is sensitive to the narrow-band near-infrared wavelength while rejecting visible light and wavelengths outside the narrow-band. Near-infrared illuminators (not illustrated) such as near-infrared LEDs or lasers that emit the narrow-band wavelength may be included in an illumination module to illuminate the eyebox region with the narrow-band near-infrared wavelength.

Figure 2A:
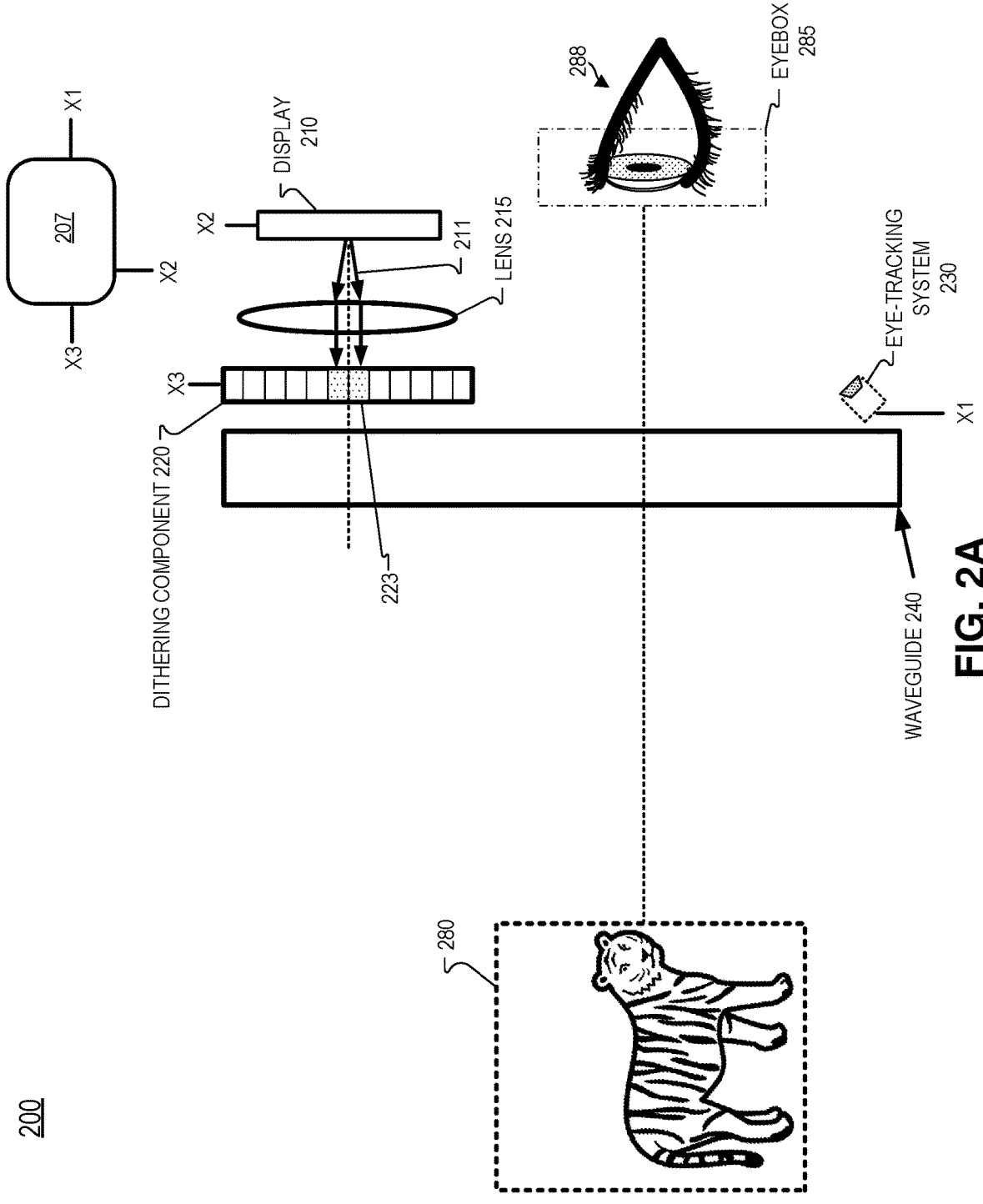
FIGS. 2A-2B illustrates a foveated display system for increasing perceived resolution of a portion of an image that is viewed by a fovea of an eye, in accordance with aspects of the disclosure.

FIG. 2A illustrates a foveated display system 200 for increasing perceived resolution of a portion of image 280 that is viewed by a fovea of an eye 288, in accordance with aspects of the disclosure. System 200 may be in included in an HMD such as HMD 100. System 200 includes processing logic 207, a display 210, a lens 215, a pixel dithering optical component 220, a waveguide 240, and an eye-tracking system 230.

Processing logic 207 is communicatively coupled to eye-tracking system 230 via communication channel X1, in the illustration of FIG. 2A. Processing logic may receive a gaze angle of eye 288 generated by eye-tracking system 230. Eye 288 resides in an eyebox region of an HMD such as HMD 100.

Processing logic 207 is communicatively coupled to display 210 via communication channel X2. Processing logic 207 may drive one or more images onto display 210 and the image(s) may be included in display light 211. Display 210 include a display pixel array. The display pixel array may be an LCD pixel array or an organic light emitting diode (OLED) pixel array, for example. Lens 215 may include refractive and/or diffractive optical elements to focus display light 211.

In operation, the display pixel array of display 210 generates display light 211. Processing logic 207 may drive one or more images onto display 210 and the image(s) may be included in display light 211. Lens 215 focuses display light 211 and the display light 211 encounters pixel dithering optical component 220.

Pixel dithering optical component 220 modulates a portion of display light 211 to shift an optical path of the display light propagating through particular zones 223 of the pixel dithering optical component 220. In an implementation pixel, dithering component 220 modulates polarization orientations of display light 211 to shift the optical paths. The one or more zones 223 of pixel dithering optical component 220 that are modulating the display light 211 are illustrated as sparsely spotted zones, in FIGS. 2A and 2B. The zones 223 of pixel dithering optical component 220 that modulate the display light 211 are driven by processing logic 207 based on eye data input received from eye-tracking system 230. The eye-data input provided to processing logic 207 by eye-tracking system 230 is based on eye-tracking system 230 imaging eye 288 in eyebox region 285. In an implementation, the eye data is a gaze angle of eye 288.

Eye-tracking system 230 may include infrared illuminators such as LEDs or lasers that are positioned to illuminate eyebox 285 with infrared illumination light. The infrared illumination light may be near-infrared illumination light. Eye-tracking system 230 may also image eyebox region 285 using non-light based technologies such as ultrasound or radio frequency-based imaging.

After display light 211 propagates through pixel dithering optical component 220, display light 211 is incoupled into waveguide 240. A diffractive optical element (unillustrated) may be included in waveguide 240 in order to incouple the display light 211 into waveguide 240. Waveguide 240 confines display light 211 as display light 211 propagates through waveguide 240. The display light 211 is outcoupled from waveguide 240 in an eyeward direction to eye 288 in order to project image 280 for presenting to eye 288. A diffractive optical element (unillustrated) may be included in waveguide 240 in order to outcouple the display light 211 from waveguide 240 to eye 288.

In FIG. 2A, eye 288 is illustrated as looking directly ahead. Eye 288 may be focusing on the face of the tiger in image 280, for example. The face-area of the tiger is the portion of the image 280 that is likely incident on the fovea of eye 288. Thus, the resolution of the face-area of the tiger is the portion of image 280 that would most benefit from higher resolution. Lower resolution in other portions of image 280 may not be noticed (or at least less noticeable) than lower resolution in the portion of the image that is being viewed by the fovea of eye 288. To increase the resolution (or perceived resolution) of the face-area of the tiger, zones 223 of pixel dithering optical component 220 are modulated to provide the increased resolution for the display light emitted by display zones of display 210 that emit the face-area of the tiger. In some implementations, a Field of View (FOV) corresponding to a gaze angle of eye 288 is identified so that zone(s) of the pixel dithering optical component 220 that affect the display light in that FOV can be modulated to increase the resolution in that FOV that is incident on the fovea area of eye 288.

Figure 2B:
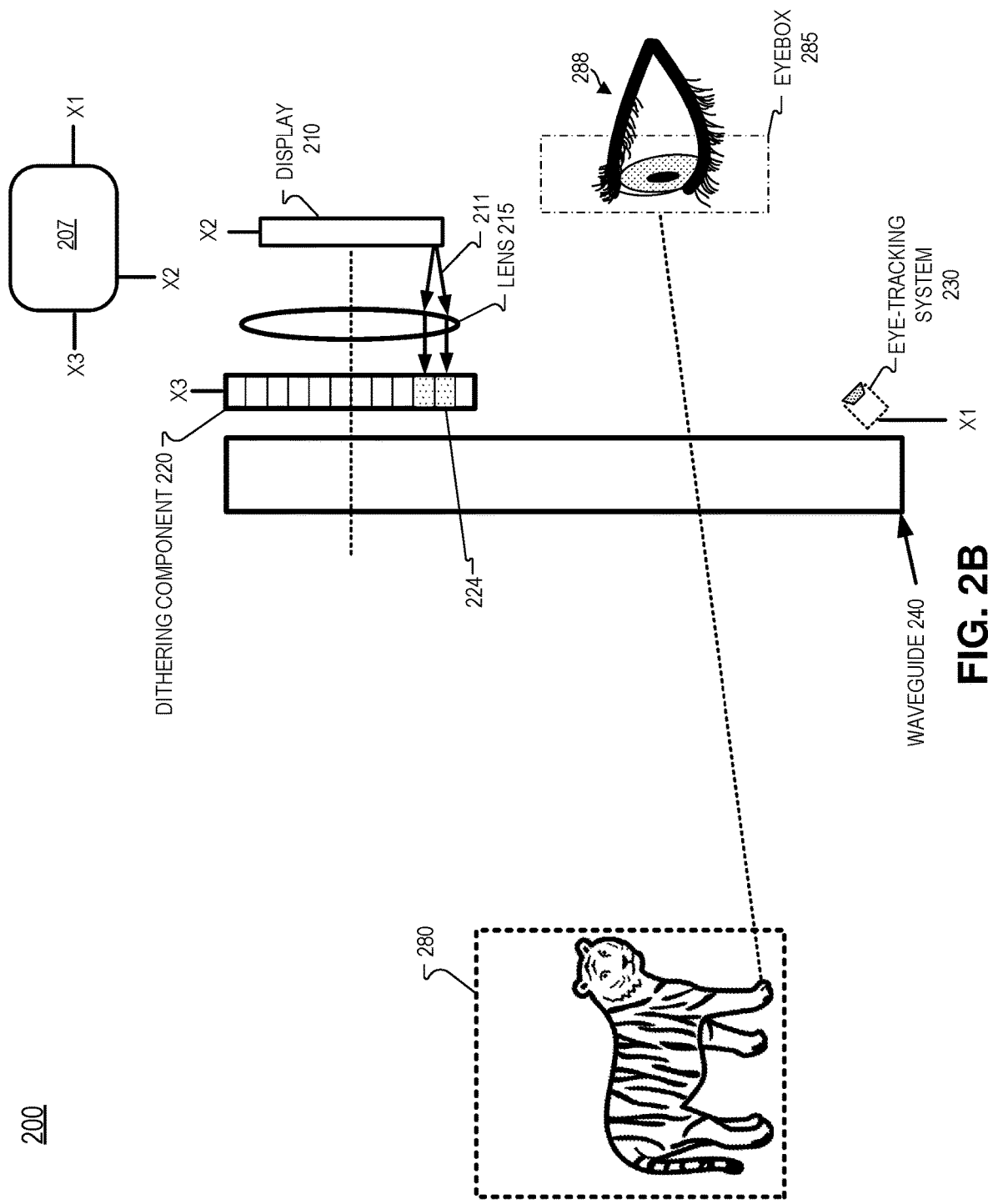

FIG. 2B illustrates eye 288 looking down and focusing on the paw of the tiger in 280. The paw of the tiger is the portion of the image 280 that is likely incident on the fovea of eye 288, in FIG. 2B. Hence, different zones of pixel dithering optical component 220 are modulated to increase the resolution of image 280 that eye 288 is looking at. In FIG. 2B, zone(s) 224 of pixel dithering optical component 220 are modulated to increase the resolution of the FOV (that includes the paws of the tiger) corresponding to a gaze angle of eye 288. The gaze angle of eye 288 is generated by eye-tracking system 230 and provided to processing logic 207 that then drives pixel dithering optical component 220.

FIG. 3 illustrates display zones 313 of an example display 310 and zones 323 of an example pixel dithering optical component 320, in accordance with aspects of the disclosure. Display 310 includes display zones 313A-313P and pixel dithering optical component 320 includes zones 323A-323P. A display zone 313 may include a portion of the pixels in a display pixel array of display 310. In the example of FIG. 3, each display zone 313 has a corresponding zone 323 of pixel dithering optical component 320 that is configured to modulate the display light emitted by the corresponding display zone. By way of example, zone 323G of pixel dithering optical component 320 corresponds to display zone 313G and is configured to modulate the display light emitted by display zone 313G.

In the illustrated example of FIG. 3, each display zone 313 has a one-to-one correspondence with a zone 323 of pixel dithering optical component 320. For example, zone 323A corresponds with display zone 313A, zone 323B corresponds with display zone 313B, and so on. Zone 323A is configured to modulate the display light emitting from display zone 313A, zone 323B is configured to modulate the display light emitting from display zone 313B, and so on. In other implementations, the display zones 313 may not have a one-to-one correspondence with zones 323 of pixel dithering optical component 320.

If processing logic 207 (with input from eye-tracking system 230) in FIG. 2A determines that display zone 313G is generating the portion of the image 280 that eye 288 is focusing on, processing logic 207 may then modulate the display light emitted from display zone 313G by modulating corresponding zone 323G to modulate the display light emitted by display zone 313G in order to increase the perceived resolution of the portion of the image 280 that eye 288 is focused on.

Figure 4A:
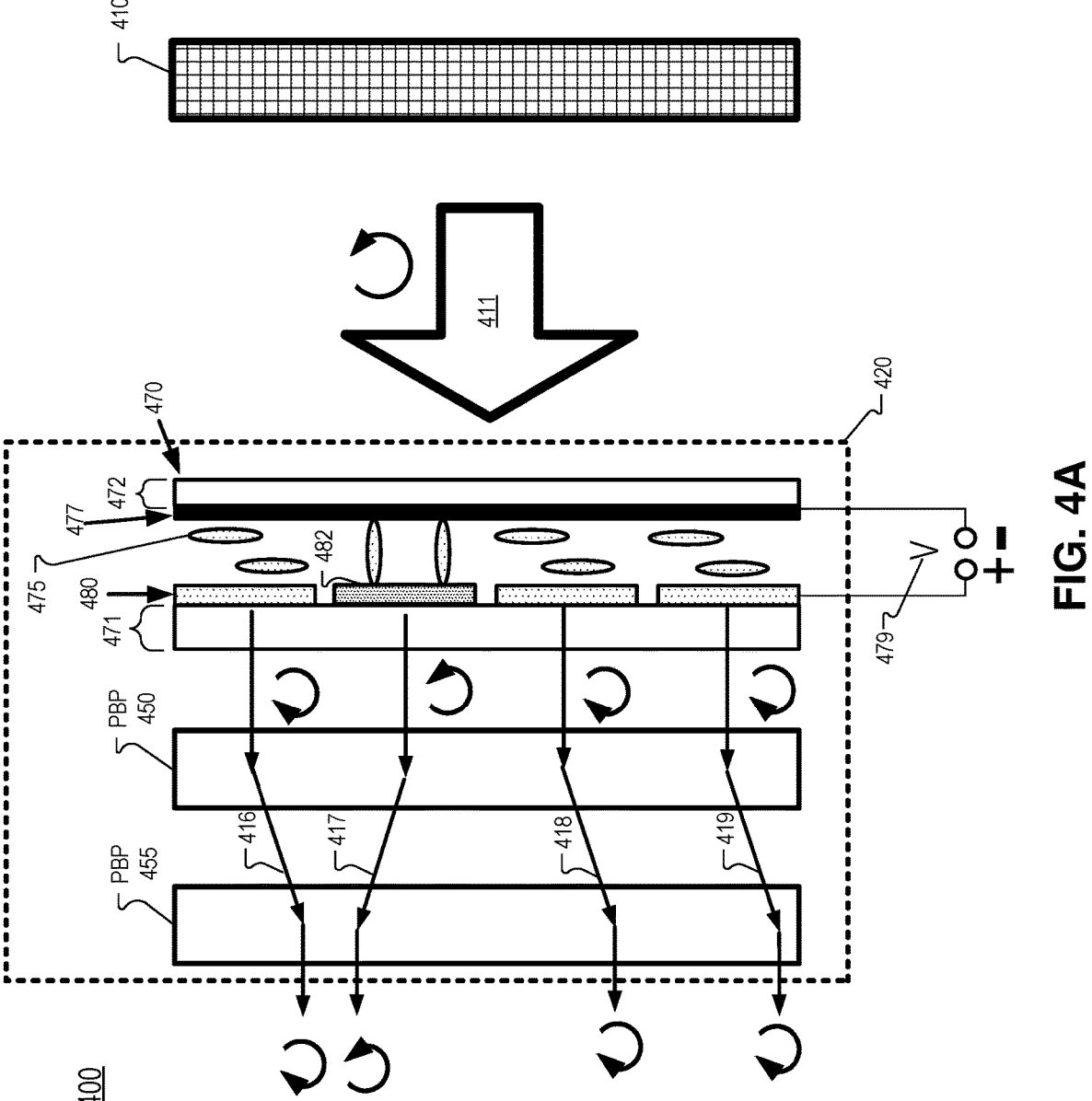
FIGS. 4A and 4B illustrate a side view of an optical system including a pixel dithering optical component that includes a zonal switchable waveplate, a first Pancharatnam-Berry Phase (PBP) grating, and a second PBP grating, in accordance with aspects of the disclosure.
Figure 4B:
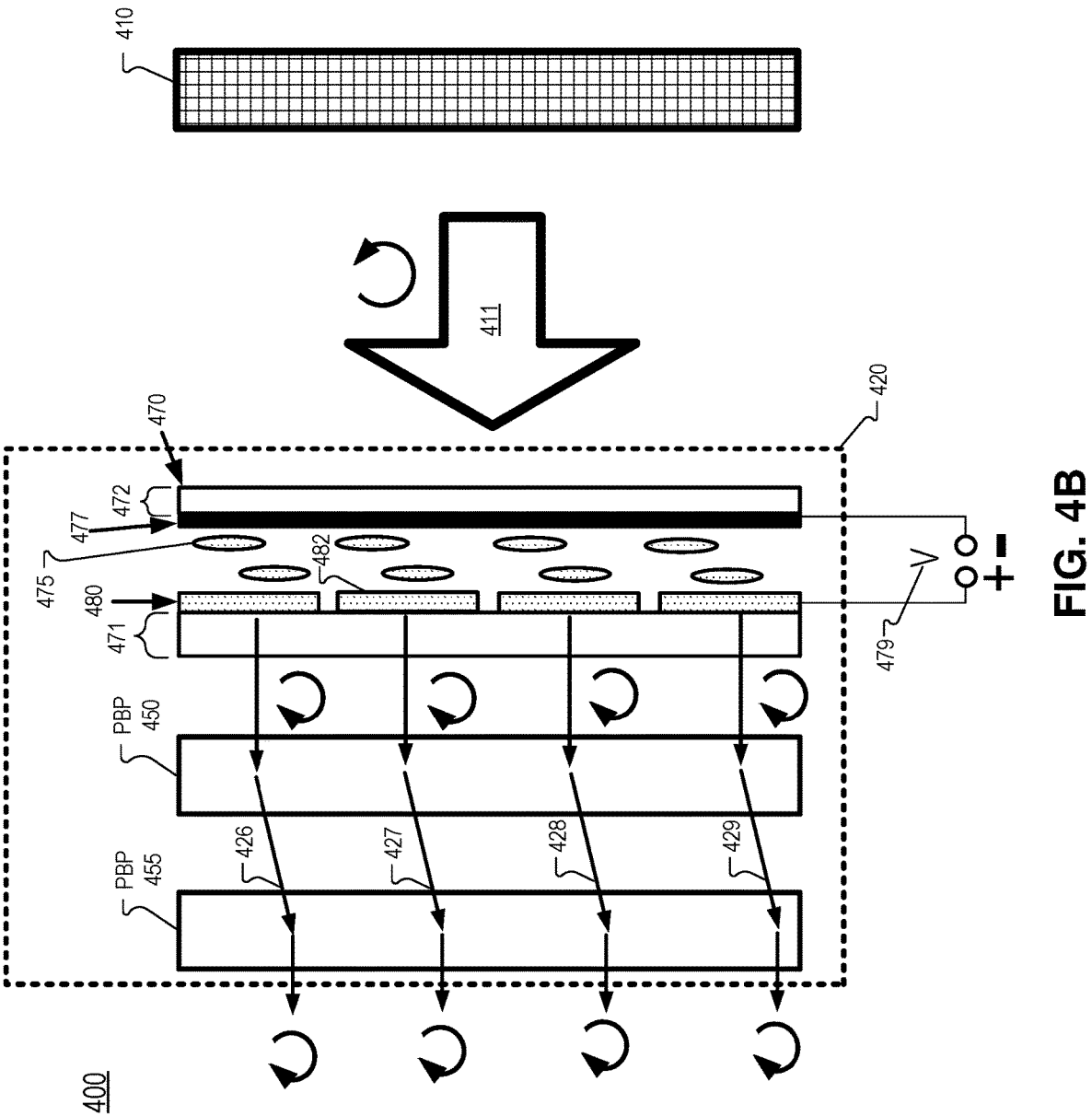

The modulation of a zone of pixel dithering optical component 220/320 depends on the specific implementation of the pixel dithering optical component. FIGS. 4A and 4B illustrate a side view of an optical system 400 including a pixel dithering optical component 420 that includes a zonal switchable waveplate 470, a first Pancharatnam-Berry Phase (PBP) grating 450, and a second PBP grating 455, in accordance with aspects of the disclosure. In FIG. 4A, display 410 is configured to generate display light 411 having a particular polarization orientation. In the illustrated implementation, display light 411 has a left-hand circular polarization (LHCP), although display light 411 may have different polarization orientations in different implementations. Display light 411 encounters pixel dithering optical component 420.

In pixel dithering optical component 420, first Pancharatnam-Berry Phase (PBP) grating 450 is disposed between zonal switchable waveplate 470 and second PBP grating 455. Zonal switchable waveplate 470 is disposed between first PBP 450 and display 410. Zonal switchable waveplate 470 includes different zones that can be individually modulated to modulate a portion of display light 411 that corresponds to a display zone that is generating the display light in the portion of the image that eye 288 is focused on. The illustrated zonal switchable waveplate 470 includes a liquid crystal implementation of a zonal switchable waveplate, although other implementations of switchable waveplates may also be used, in accordance with implementations of the disclosure. Zonal switchable waveplate 470 includes a first substrate layer 471, a second substrate layer 472, a segmented electrode layer 480, and a common electrode layer 477. First substrate layer 471 and second substrate layer 472 may be of a transparent material such as glass. Segmented electrode layer 480 and common electrode layer 477 may be formed of a transparent conductive material such as indium-titanium-oxide (ITO). Liquid crystals 475 are confined between segmented electrode layer 480 and common electrode layer 477. Segmented electrode layer 480 includes zones having electrodes that are individually selectable. In other words, different voltage levels can be applied to the different zones of the segmented electrode 480.

When no voltage is applied to the zones of segmented electrode 480, the first polarization orientation of display light 411 is converted to a second polarization orientation that is opposite-handed to the first polarization orientation.

In the example illustrated in FIG. 4A, the unselected zones of segmented electrode layer 480 converts the LHCP display light 411 into right-hand circular polarization (RHCP) when no voltage is applied, as shown by optical paths 416, 418, and 419 as the display light exits zonal switchable waveplate 470.

When a voltage 479 is applied to a zone of the segmented electrode layer 480, display light 411 retains its polarization orientation after propagating through that zone. In the example illustrated in FIG. 4A, the selected zone 482 of segmented electrode layer 480 allows LHCP display light 411 to retain the LHCP polarization orientation, as shown by optical path 417 as the display light exits zonal switchable waveplate 470. Thus, zonal switchable waveplate 470 is configured as a regional switchable half-waveplate (HWP), in FIG. 4A.

A switchable HWP is configured to shift the polarization axis of incident light by $\pi/2$ (90 degrees). Therefore, circularly polarized light may be converted to the opposite-handed circularly polarized light by an HWP. The switchable HWP may be designed to be a so called "zero order waveplate" so that the retardance imparted by the switchable HWP remains close to half of a wave independent of the wavelength and angle of incidence of incoming light.

First PBP 450 diffracts opposite-handed polarized light in a symmetrical manner. Consequently, PBP grating 450 is configured to diffract the first polarization orientation (RHCP) at a first diffraction angle and diffract the second polarization orientation (LHCP) at a second diffraction angle that is symmetrical to the first diffraction angle. In FIG. 4A, the light propagating along optical paths 416, 418, and 419 is shifted at a first diffraction angle while the light propagating along optical path 417 is diffracted at a second diffraction angle symmetrical to the first diffraction angle.

The light in optical paths 416, 417, 418, and 419 then encounter a second PBP grating 455 that functions as an angular correction component so that the output light from zonal switchable waveplate 470 is parallel regardless of whether the light propagated through an unactivated zone or an activated zone (e.g. zone 482). Second PBP grating 455 may also be configured to diffract opposite-handed polarized light in a symmetrical manner.

FIG. 4B shows optical system 400 when zone 482 in unactivated and thus display light 411 is converted to RHCP light for all the zones of zonal switchable waveplate 470, as shown for optical paths 416, 417, 418, and 419. FIGS. 4A and 4B illustrate that the optical path of light in different optical paths can be shifted by modulating a pixel dithering optical component such as zonal switchable waveplate 470. In implementations of the disclosure, for a display zone identified by processing logic 207, a zone of zonal switchable waveplate 470 is modulated between different subframes of a frame of an image presented to eye 288 in order to shift the optical path of the display light exiting a particular display zone. For example, optical path 417 in FIG. 4A is shifted from the optical path 427 in FIG. 4B, which provides double the resolution for an image, when subframes of the images are driven onto the display 410 in synchronization with the modulation of zones of zonal switchable waveplate 470 that correspond to the display zone that is being focused on by eye 288.

In an example implementation, a first image is driven onto display 410 during a first subframe while one or more zones of zonal switchable waveplate 470 are activated. Then a second image is driven onto display 410 during a second subframe while none of the zones of zonal switchable waveplate 470 are activated. The first image and the second image may be the same except for differences within the corresponding display zone of display 410 that eye 288 is focused on. The differences within the corresponding display zone allows the two subframes to combine into a single frame that is perceived to have double the resolution compared to the other display zones because of the persistence of vision of the eye over time that allows the subframes to blend into a single frame as long as the display is able to refresh the subframes at a high enough refresh rate (e.g. 60 frames per second or higher). In some implementations, the lateral shift between optical path 417 and 427 is less than the pixel pitch of pixels in the display pixel array of display 410.

Figure 5A:
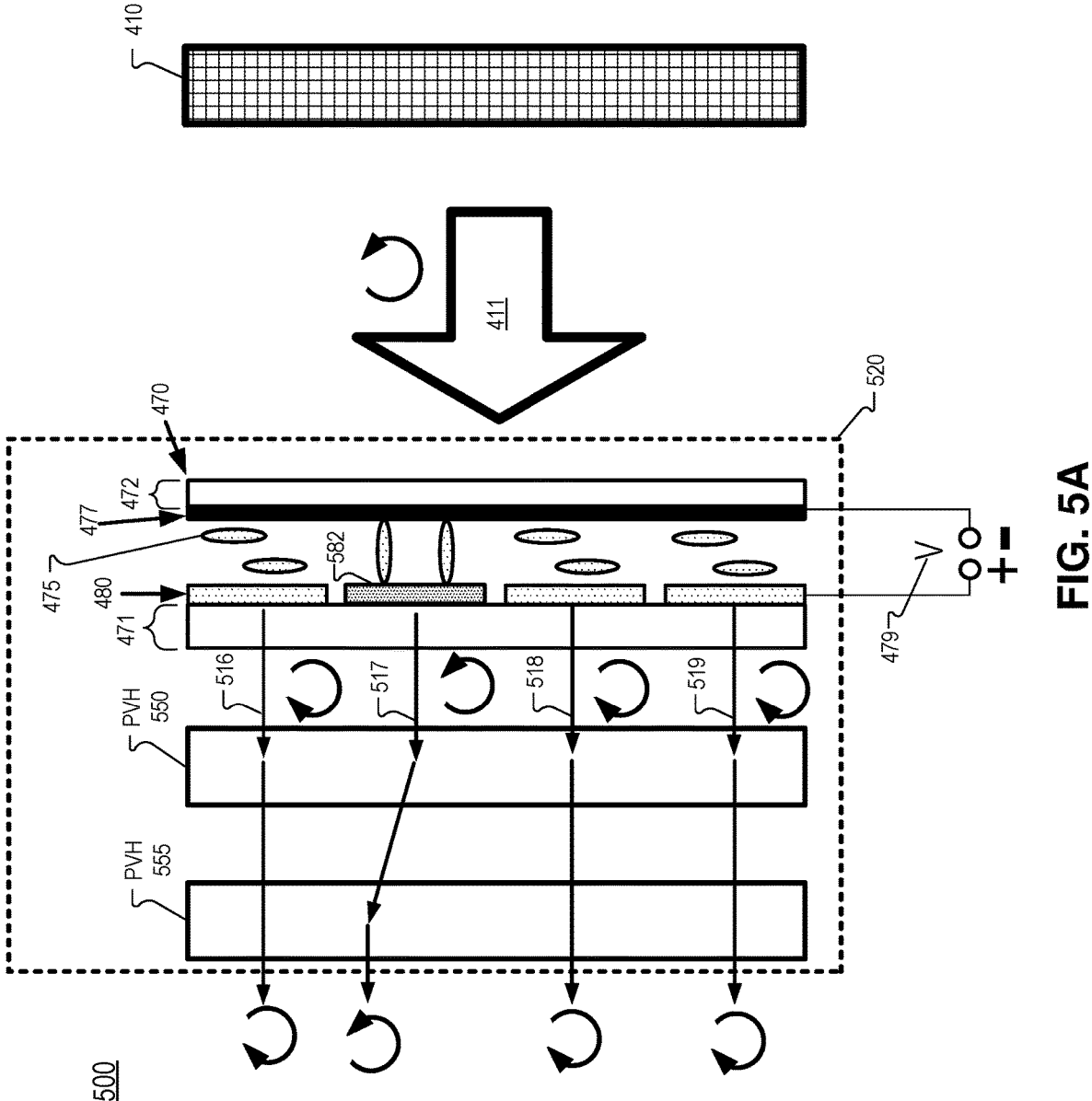
FIGS. 5A and 5B illustrate a side view of and optical system having an implementation of a pixel dithering optical component that includes a zonal switchable waveplate, a first polarization volume hologram (PVH), and a second PVH, in accordance with aspects of the disclosure.
Figure 5B:
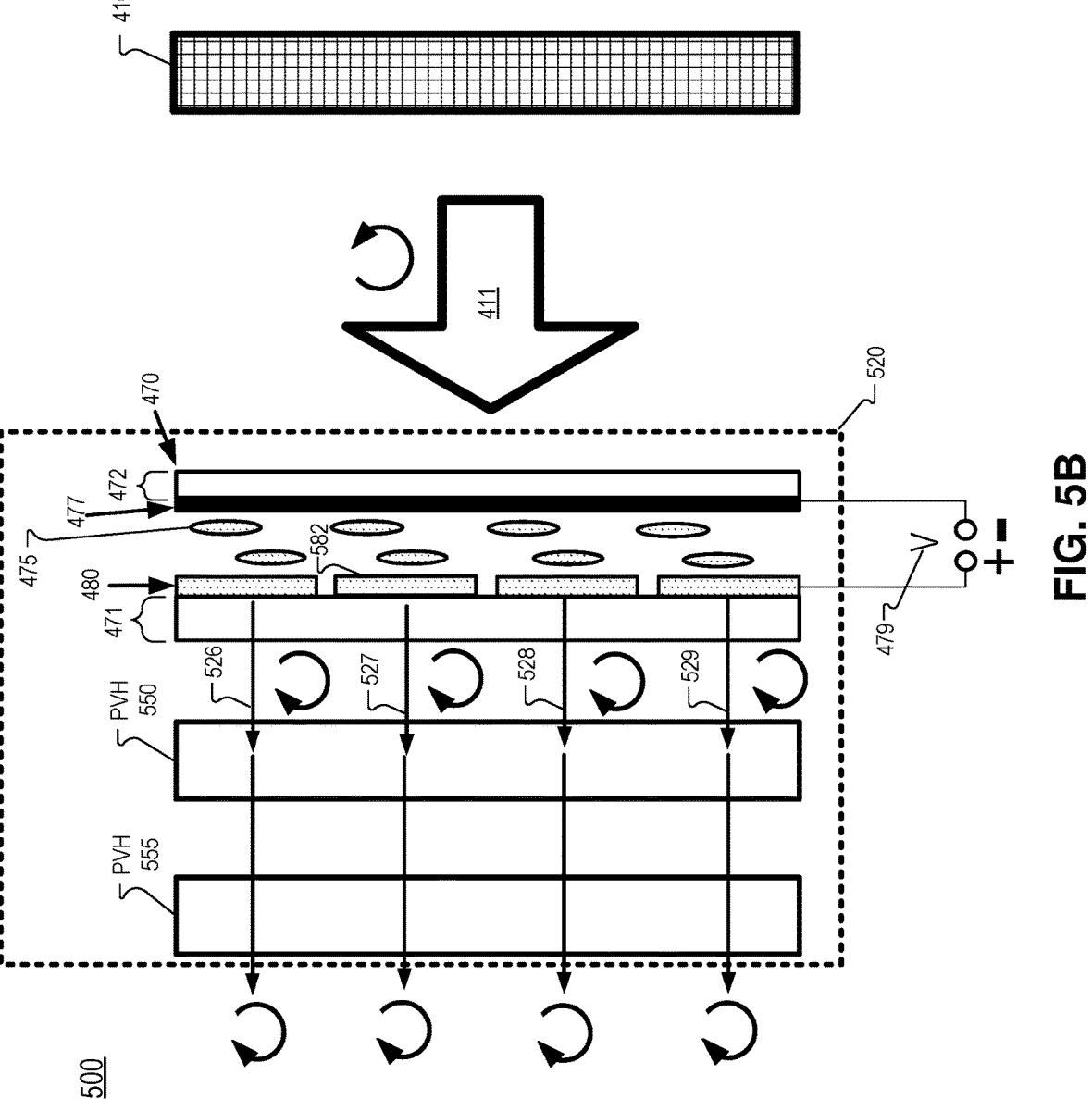

FIGS. 5A and 5B illustrate a side view of and optical system 500 having a different implementation of a pixel dithering optical component 520 that includes a zonal switchable waveplate 470, a first polarization volume hologram (PVH) 550, and a second PVH 555, in accordance with aspects of the disclosure. Optical system 500 may include the same display 410 and zonal switchable waveplate 470, but optical system 500 includes PVH optical components rather than PBP optical components.

In FIG. 5A, display 410 is configured to generate display light 411 having a particular polarization orientation. In the illustrated implementation, display light 411 has a left-hand circular polarization (LHCP), although display light 411 may have different polarization orientations in different implementations. Display light 411 encounters pixel dithering optical component 520.

In pixel dithering optical component 520, first PVH 550 is disposed between zonal switchable waveplate 470 and second PVH 555. Zonal switchable waveplate 470 is disposed between first PVH 550 and display 410. Zonal switchable waveplate 470 includes different zones that can be individually modulated to modulate a portion of display light 411 that corresponds to a display zone that is generating the display light in the image that eye 288 is focused on. The illustrated zonal switchable waveplate 470 includes a liquid crystal implementation of a zonal switchable waveplate, although other implementations of switchable waveplates may also be used, in accordance with implementations of the disclosure.

When no voltage is applied to the zones of segmented electrode 480, the first polarization orientation of display light 411 is converted to a second polarization orientation that is opposite-handed to the first polarization orientation. In the example illustrated in FIG. 5A, the unselected zones of segmented electrode layer 480 converts the LHCP display light 411 into right-hand circular polarization (RHCP) when no voltage is applied, as shown by optical paths 516, 518, and 519 as the display light exits zonal switchable waveplate 470.

When a voltage 479 is applied to a zone of the segmented electrode layer 480, display light 411 retains its polarization orientation. In the example illustrated in FIG. 5A, the selected zone 582 of segmented electrode layer 480 allows LHCP display light 411 to retain the LHCP polarization orientation, as shown by optical path 517 as the display light exits zonal switchable waveplate 470. Thus, zonal switchable waveplate 470 is configured as a regional switchable half-waveplate (HWP), in FIG. 5A. A switchable HWP is configured to shift the polarization axis of incident light by $\pi/2$ (90 degrees). Therefore, circularly polarized light may be converted to the opposite-handed circularly polarized light by an HWP.

First PVH 550 is polarization selective and diffracts a first polarization orientation and passes a second polarization orientation that is opposite-handed to the first polarization orientation. In other words, PVH 550 does not diffract opposite-handed polarization orientations in a symmetrical manner like PBP 450. In the example illustration in FIG. 5A, first PVH 550 is configured to diffract the first polarization orientation (LHCP) at a first diffraction angle and pass the second polarization orientation (RHCP). In FIG. 5A, the light propagating along optical path 517 is diffracted at a diffraction angle that shifts the optical path 517 and the light propagating along optical paths 516, 518, and 519 is passed through first PVH 550.

The light in optical paths 516, 517, 518, and 519 then encounter a second PVH 555 that functions as an angular correction component for optical path 517 so that the light in optical path 517 (from the activated zone 582) is parallel to the light in optical paths 516, 518, and 519 (from the unactivated zones).

FIG. 5B shows optical system 500 when zone 582 in unactivated and thus display light 411 is converted to RHCP light for all the zones of zonal switchable waveplate 470, as shown for optical paths 516, 517, 518, and 519. FIGS. 5A and 5B illustrate that the optical path of light in different optical paths can be shifted by modulating a pixel dithering optical component such as zonal switchable waveplate 470. In implementations of the disclosure, for a display zone identified by processing logic 207, a zone of zonal switchable waveplate 470 is modulated between different subframes of a frame of an image presented to eye 288 in order to shift the optical path of the display light exiting a particular display zone. For example, optical path 517 in FIG. 5A is shifted from the optical path 527 in FIG. 5B, which provides double the resolution for an image, when subframes of the images are driven onto the display 410 in synchronization with the modulation of zones of zonal switchable waveplate 470 that correspond to the display zone that is being focused on by eye 288.

In an example implementation, a first image is driven onto display 410 during a first subframe while one or more zones of zonal switchable waveplate 470 are activated. Then a second image is driven onto display 410 during a second subframe while none of the zones of zonal switchable waveplate 470 are activated. The first image and the second image may be the same except for differences within the corresponding display zone of display 410 that eye 288 is focused on. The differences within the corresponding display zone allows the two subframes to combine into a single frame that is perceived to have double the resolution compared to the other display zones because of the persistence of vision of the eye over time that allows the subframes to blend into a single frame as long as the display is able to refresh the subframes at a high enough refresh rate (e.g. 60 frames per second or higher). In some implementations, the lateral shift between optical path 517 and 527 is less than the pixel pitch of pixels in the display pixel array of display 410.

Figure 6A:
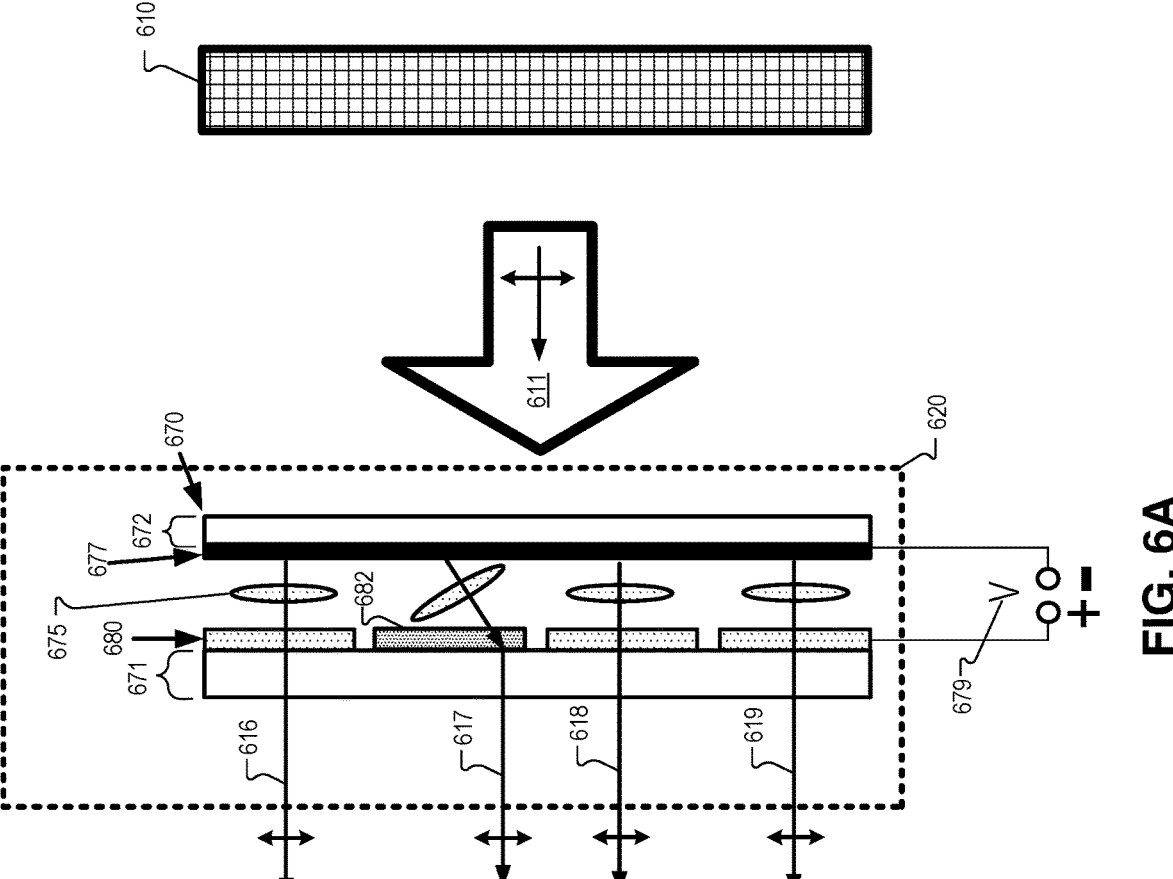
FIG. 6A illustrates a side view of an optical system including a pixel dithering optical component and a display, in accordance with aspects of the disclosure.

FIG. 6A illustrates a side view of an optical system 600 including a pixel dithering optical component 620 and a display 610, in accordance with aspects of the disclosure. In FIG. 6A, display 610 is configured to generate display light 611 having a particular linear polarization. In the illustrated implementation, display light 611 has a parallel polarization orientation, although display light 611 may have different polarization orientations in different implementations. Display light 611 encounters pixel dithering optical component 620.

In the illustration of FIG. 6A, pixel dithering optical component 620 includes a zonal liquid crystal layer 670 including zones (e.g. zone 682) overlaying corresponding display zones of a display pixel array of display 610. Zonal liquid crystal layer 670 includes a first substrate layer 671, a second substrate layer 672, a segmented electrode layer 680, and a common electrode layer 677. First substrate 671 and second substrate 672 may be of a transparent material such as glass. Segmented electrode layer 680 and common electrode layer 677 may be formed of a transparent conductive material such as indium-titanium-oxide (ITO). Liquid crystals 675 are confined between segmented electrode layer 680 and common electrode layer 677. Segmented electrode layer 680 includes zones having electrodes that are individually selectable. In other words, different voltage levels can be applied to the different zones of the segmented electrode 680.

Figure 6B:
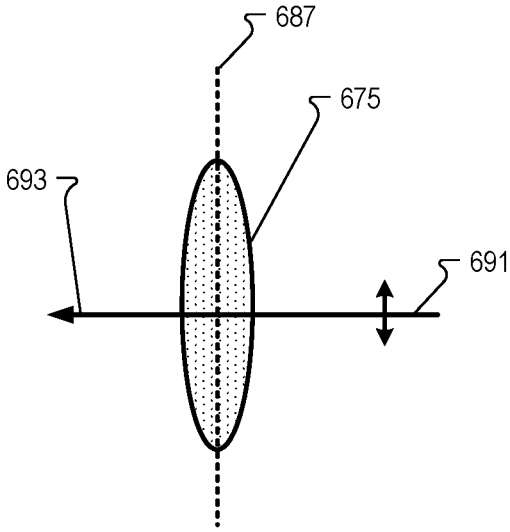
FIG. 6B illustrates a liquid crystal molecule having an optics axis consistent with an orientation of a liquid crystal molecule in a first state driven onto a zone of a zonal liquid crystal layer, in accordance with aspects of the disclosure.

FIG. 6B illustrates a liquid crystal molecule 675 having an optics axis 687 consistent with an orientation of the liquid crystal molecule 675 in a first state driven onto a zone of zonal liquid crystal layer 670. In this first state, light 691 passes through liquid crystal molecule 675 along unshifted optical path 693. By way of example for FIG. 6B, let the propagation direction of light 693 be a z-direction and the long axis 687 of liquid crystal molecule 675 be a y-direction. Hence, input light 611 in FIG. 6A is y-linearly-polarized light. When the long axis 687 of liquid crystal molecule 675 is aligned in the y-direction, there is no Poynting vector changes, which is still in the z-direction. When liquid crystal molecule 675 orientates in the y-z plane, the direction of the Poynting vector changes.

Figure 6C:
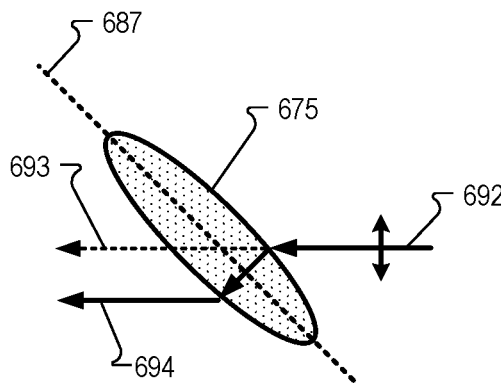
FIG. 6C illustrates liquid crystal molecule having an optics axis consistent with an orientation of the liquid crystal molecule in a second state driven onto a zone of a zonal liquid crystal layer, in accordance with aspects of the disclosure.

FIG. 6C illustrates liquid crystal molecule 675 having an optics axis 687 consistent with an orientation of the liquid crystal molecule 675 in a second state driven onto a zone of zonal liquid crystal layer 670. In this second state, the zonal liquid crystal layer 670 aligns liquid crystal molecule 675 within the zone to have an optics axis 687 that is not perpendicular to the linear polarization orientation of light 692 so that light 692 is laterally shifted along optical path 694 instead of optical path 693. FIG. 6C shows that the poynting vector of light (the energy propagation direction of light) can be tuned according to the orientation of the liquid crystal molecules when the polarization orientation of the input light 692 is not perpendicular to the optics axis of the liquid crystal molecule 675. Notably, even though the poynting vector is changed in FIG. 6C, the light 694 exiting liquid crystal molecule 675 is still propagating in a parallel direction as input light 692 and light 693.

FIG. 6A illustrates zone 682 being driven to the second state (liquid crystal 675 optical axis not perpendicular to parallel linear polarization of incoming display light 611) while the remaining zones are driven to the first state (liquid crystal 675 optical axis parallel to the parallel linear polarization of incoming display light 611). This results in a lateral shift in the light propagating along optical path 617 that encounters zone 682, whereas the light propagating along optical paths 616, 618, and 619 is unshifted since that light is passed through zonal liquid crystal layer 670 without lateral shifting from the liquid crystals 675 in the zones driven to the first state. The first state and the second state of zones of zonal liquid crystal layer 670 may be modulated by an electric field or a magnetic field. Voltage 679 in FIG. 6A may modulate an electric field across the zones of zonal liquid crystal layer 670 to control the orientation of liquid crystal 675, for example.

Figure 6D:
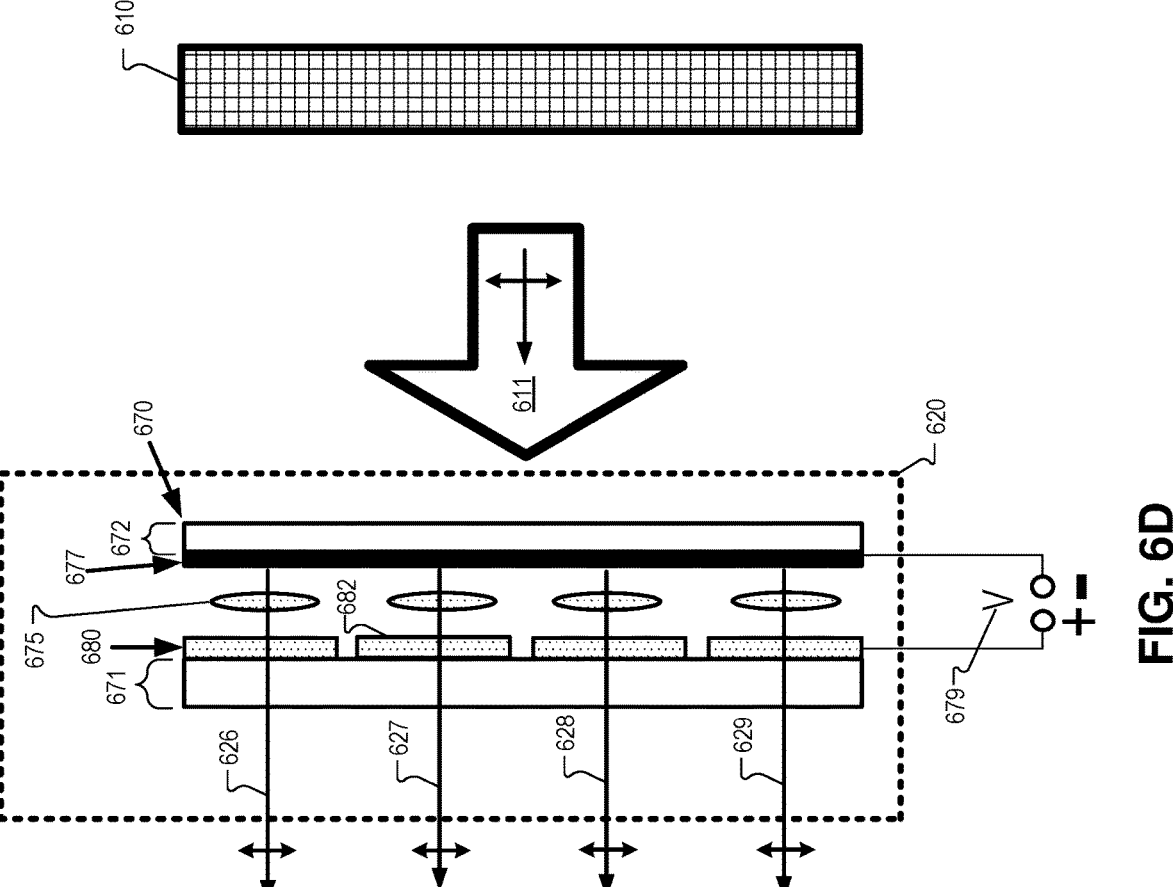
FIG. 6D illustrates all the zones of a zonal liquid crystal layer being driven to a first state, in accordance with aspects of the disclosure.

FIG. 6D illustrates all the zones of zonal liquid crystal layer 670 being driven to the first state where the optical axis of liquid crystals 675 are parallel to the parallel linear polarization of incoming display light 611. Thus, display light 611 passes unshifted through zonal liquid crystal layer 670 along optical paths 626, 627, 628, and 629.

In implementations of the disclosure, for a display zone identified by processing logic 207, a zone of zonal liquid crystal layer 670 is modulated between different subframes of a frame of an image presented to eye 288 in order to shift the optical path of the display light exiting a particular display zone. For example, optical path 617 in FIG. 6A is shifted from the optical path 627 in FIG. 6D, which provides double the resolution for an image, when subframes of the images are driven onto the display 610 in synchronization with the modulation of zones of zonal liquid crystal layer 670 that correspond to the display zone that is being focused on by eye 288.

In an example implementation, a first image is driven onto display 610 during a first subframe while one or more zones of zonal liquid crystal layer 670 are activated. Then a second image is driven onto display 610 during a second subframe while none of the zones of zonal liquid crystal layer 670 are activated. The first image and the second image may be the same except for differences within the corresponding display zone of display 610 that eye 288 is focused on. The differences within the corresponding display zone allows the two subframes to combine into a single frame that is perceived to have double the resolution compared to the other display zones because of the persistence of vision of the eye over time that allows the subframes to blend into a single frame as long as the display is able to refresh the subframes at a high enough refresh rate (e.g. 60 frames per second or higher). In some implementations, the lateral shift between optical path 617 and 627 is less than the pixel pitch of pixels in the display pixel array of display 610.

Figure 7A:
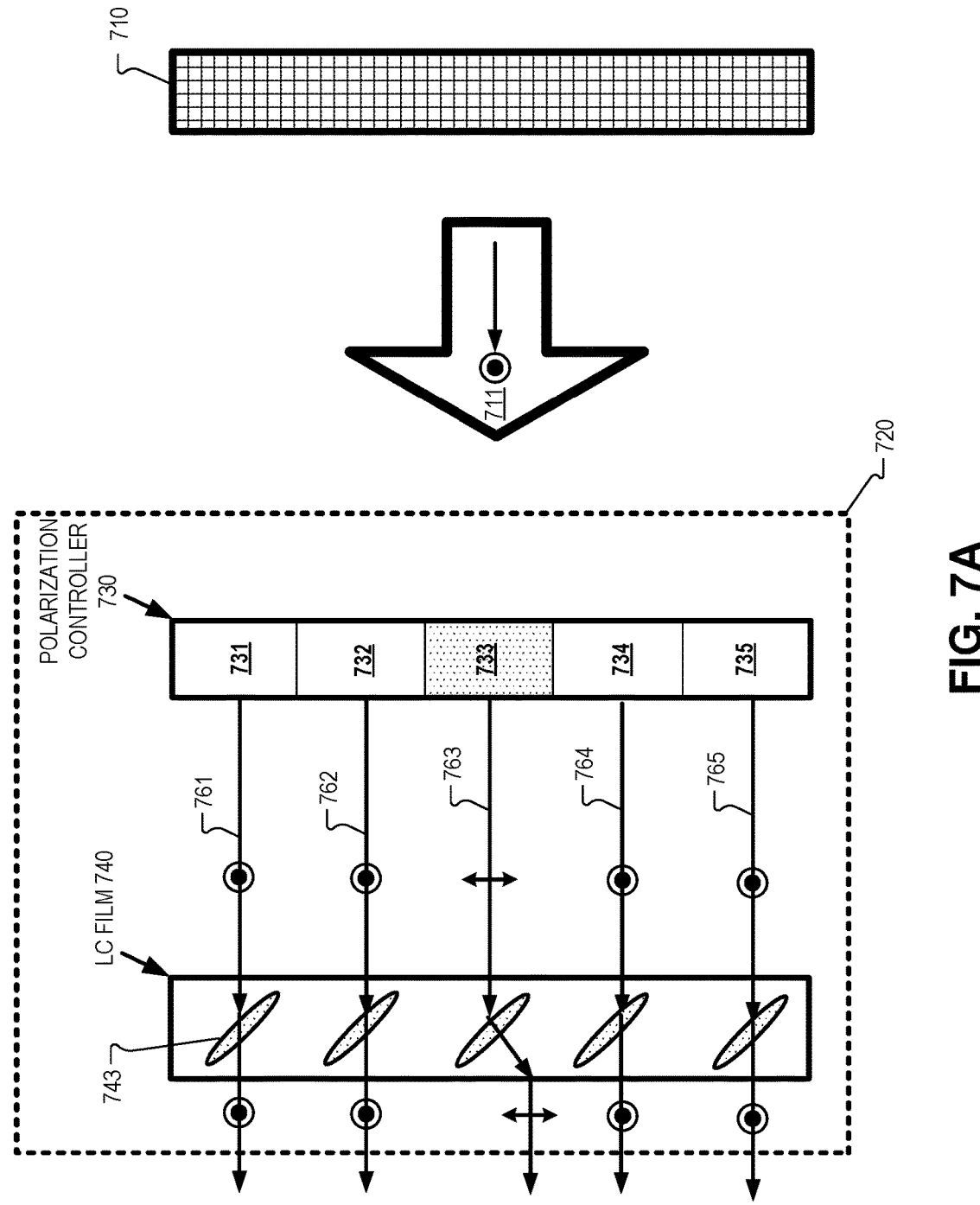
FIGS. 7A-7B illustrate a side view of an optical system including a pixel dithering optical component and a display, in accordance with aspects of the disclosure.

FIG. 7A illustrates a side view of an optical system 700 including a pixel dithering optical component 720 and a display 710, in accordance with aspects of the disclosure. In FIG. 7A, display 710 is configured to generate display light 711 having a particular linear polarization. In the illustrated implementation, display light 711 has a perpendicular polarization orientation, although display light 711 may have different polarization orientations in different implementations. Display light 711 encounters pixel dithering optical component 720.

In the illustration of FIG. 7A, pixel dithering optical component 720 includes a liquid crystal film 740 and zonal polarization controller layer 730. Zonal polarization controller layer 730 is disposed between the display pixel array of display 710 and liquid crystal film 740.

Liquid crystal film 740 includes liquid crystal molecules in a fixed orientation so that the first linear polarization orientation of display light 711 passes through liquid crystal film 740 while a second linear polarization (that is orthogonal to the first linear polarization) is laterally shifted by the fixed orientation of the liquid crystal molecules in liquid crystal film 740. In other words, liquid crystal film 740 shifts an optical path of the second polarization orientation but not the first polarization orientation. In an implementation, liquid crystal film 740 is a polymerized liquid crystal film having liquid crystals disposed in a fixed orientation. Liquid crystal film 740 may have a uniform profile of liquid crystal orientation. In an implementation, liquid crystal film 740 is configured to provide a different refraction index for different polarization of incoming light (e.g. display light 711).

Zonal polarization controller layer 730 including zones 731, 732, 733, 734, and 735 overlaying corresponding display zones of a display pixel array of display 710. Each zone of zonal polarization controller layer 730 is individually selectable to modulate the polarization of incoming display light 711. Zonal polarization controller layer 730 may include a zonal switchable waveplate with individually switchable waveplates for each zone, for example. Zonal polarization controller layer 730 may include Twisted Nematic (TN) cells with thin-film-transistor (TFT) implementations or Ferroelectric liquid crystal (FLC) implementations.

In operation, display light 711 is emitted from the display pixel array of display 710 and encounters zonal polarization controller layer 730 of pixel dithering optical component 720. In the illustration of FIG. 7A, zones 731, 732, 734, and 735 are unactivated (a first state) while zone 733 of zonal polarization controller layer 730 is activated (a second state). Hence, display light 711 propagates through zones 731, 732, 734, and 735 unmodulated and retaining polarization orientation, as shown in optical paths 761, 762, 764, and 765. The activated zone 733 converts the linear polarization of display light 711 to an orthogonal linear polarization orientation. In FIG. 7A, the perpendicular linear polarization of display light 711 is converted to the parallel linear polarization orientation of optical path 763.

The perpendicular linearly polarized light propagating along optical paths 761, 762, 764, and 765 encounters liquid crystal film 740 and passes through unshifted (as if liquid crystal film 740 was an isotropic medium). Meanwhile, the parallel linearly polarized light propagating along optical path 763 is shifted by liquid crystal film 740 since the light in optical path 763 is a parallel orientation that is not perpendicular to the optical axis of the liquid crystal molecules in liquid crystal film 740.

Figure 7B:
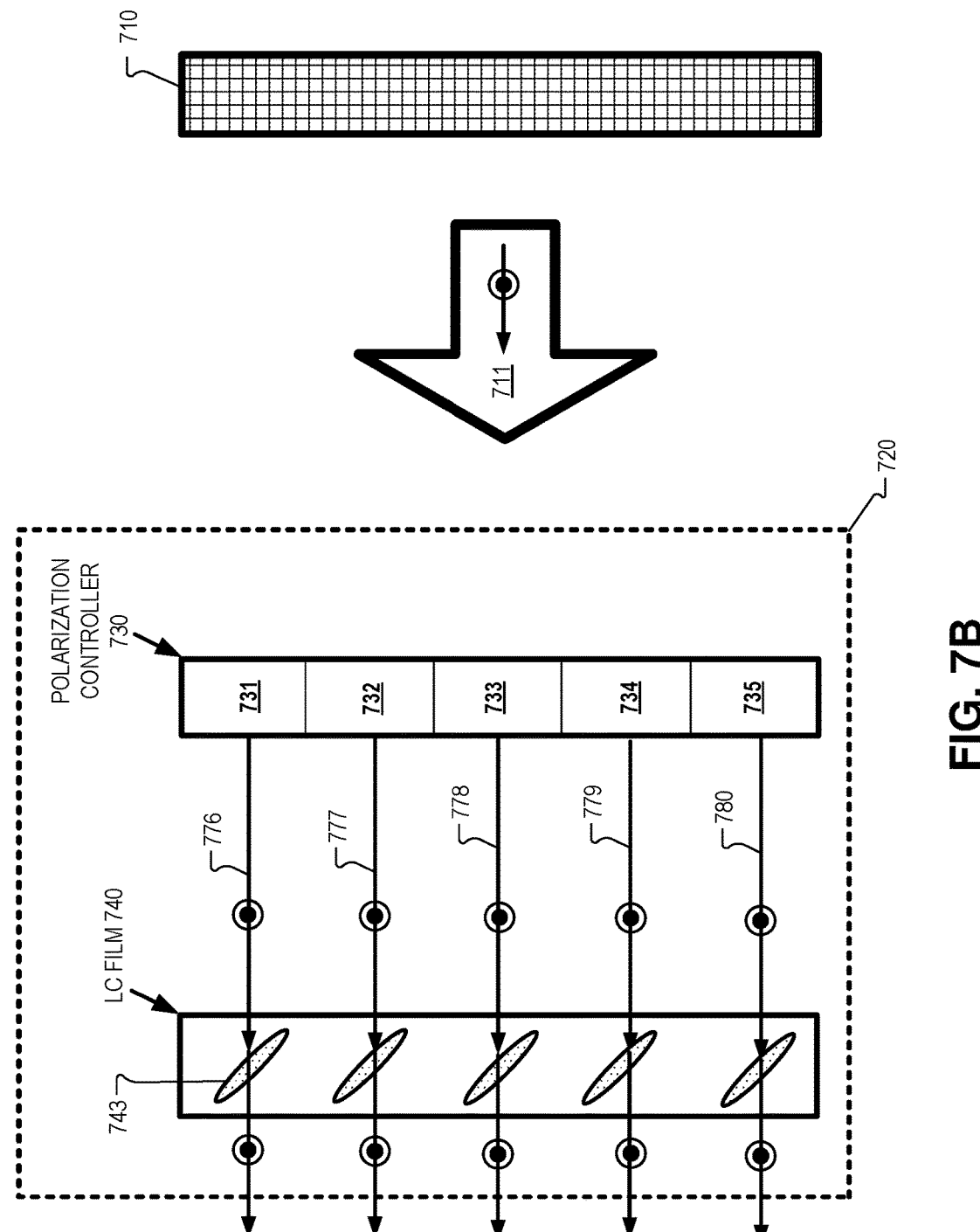

In FIG. 7B, zones 731, 732, 733, 734, and 735 are unactivated (the first state). Hence, display light 711 propagates through zones 731, 732, 733, 734, and 735 unmodulated and retaining polarization orientation, as shown in optical paths 776, 777, 778, 779, and 780. The light propagating along optical paths 776, 777, 778, 779, and 780 encounters liquid crystal film 740 and passes through unshifted since the light is in a perpendicular linear polarization with respect to the optical axis of the liquid crystal molecules in liquid crystal film 740.

In implementations of the disclosure, for a display zone identified by processing logic 207, a zone of zonal polarization controller layer 730 is modulated between different subframes of a frame of an image presented to eye 288 in order to shift the optical path of the display light exiting a particular display zone. For example, optical path 763 in FIG. 7A is shifted from the optical path 778 in FIG. 7B, which provides double the resolution for an image, when subframes of the images are driven onto the display 710 in synchronization with the modulation of zones of zonal polarization controller layer 730 that correspond to the display zone that is being focused on by eye 288.

In an example implementation, a first image is driven onto display 710 during a first subframe while one or more zones of zonal polarization controller layer 730 are activated. Then a second image is driven onto display 710 during a second subframe while none of the zones of zonal polarization controller layer 730 are activated. The first image and the second image may be the same except for differences within the corresponding display zone of display 710 that eye 288 is focused on. The differences within the corresponding display zone allows the two subframes to combine into a single frame that is perceived to have double the resolution compared to the other display zones because of the persistence of vision of the eye over time that allows the subframes to blend into a single frame as long as the display is able to refresh the subframes at a high enough refresh rate (e.g. 60 frames per second or higher). In some implementations, the lateral shift between optical path 763 and 778 is less than the pixel pitch of pixels in the display pixel array of display 710.

FIG. 8 illustrates an example flow chart for a process 800 of modulating display light to increase perceived resolution of a display, in accordance with aspects of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel. Processing logic 107 or 207 may perform all or a portion of the process blocks in process 800.

In process block 805, a gaze angle of an eye of a user is detected. The gaze angle may be received from an eye-tracking system of a head mounted display, in some implementations. In some implementations, gaze data is received from an eye-tracking system and a gaze direction of the user can be derived from the gaze data.

In process block 810, a Field of View (FOV) is identified in a foveated area corresponding to the gaze angle. The FOV in the foveated area may correspond to a portion of an image that an eye of a user is focused to.

In process block 815, a corresponding display zone (of a display) is associated with the FOV in the foveated area. The corresponding display zone that corresponds with the FOV may be the display zone of a display that generates the display light generating an image in the identified FOV.

In process block 820, for the corresponding display zone, the display light is modulated between a first polarization orientation in a first subframe and a second polarization orientation in a second subframe where a display frame includes the first subframe and the second subframe. The first subframe may be 8 ms followed by the second subframe of 8 ms to make a display frame of 16 ms, for example. Modulating between the first polarization orientation and the second polarization orientation shifts an optical path of the display light in the corresponding display zone.

In some implementations, process 800 may return to process block 805 after executing process block 820 to remeasure the gaze angle of the eye. Measuring a new gaze angle of the eye may indicate that the user is gazing in a different direction, and consequently, that display light generated by a new corresponding display zone should be modulated to provide foveated rendering to the new corresponding display zone that the user is focused on.

Shifting the optical path of the display light between subframes may increases a perceived resolution of the corresponding display zone.

Modulating the display light between the first polarization orientation in the first subframe and a second polarization orientation in the second subframe includes driving a zonal switchable waveplate between a first state and a second state, in some implementations. The zonal switchable waveplate may output the first polarization orientation of the display light in the first state and outputs the second polarization orientation of the display light in the second state.

In an implementation, the zonal switchable waveplate is disposed between a Pancharatnam-Berry Phase (PBP) grating and the corresponding display zone. The PBP grating may be configured to diffract the first polarization orientation at a first diffraction angle and the PBP grating may be configured to diffract the second polarization orientation at a second diffraction angle where the first polarization orientation is opposite-handed of the second polarization orientation. The first diffraction angle may be symmetrical to the second diffraction angle.

In an implementation, the zonal switchable waveplate is disposed between a polarization volume hologram (PVH) and the corresponding display zone. The PVH is configured to diffract the first polarization orientation to generate the shift in the optical path and the PVH is configured to pass the second polarization orientation that is opposite-handed of the first polarization orientation.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 107/207) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
detecting a gaze angle of an eye of a user;
identifying a Field of View (FOV) in a foveated area corresponding to the gaze angle;
associating a corresponding display zone of a display that corresponds with the FOV in the foveated area; and
for the corresponding display zone, modulating display light between a first polarization orientation in a first subframe and a second polarization orientation in a second subframe, wherein a display frame includes the first subframe and the second subframe, and wherein modulating between the first polarization orientation and the second polarization orientation shifts an optical path of the display light in the corresponding display zone between a first direction and a second direction that is nonparallel to the first direction; and
shifting, by an angular correction component, the display light in at least one of the first subframe and the second subframe such that the display light output from the angular correction component is parallel during each of the first subframe and the second subframe.

2. The method of claim 1, wherein shifting the optical path of the display light between subframes increases a perceived resolution of the corresponding display zone.

3. The method of claim 1, wherein modulating the display light between the first polarization orientation in the first subframe and the second polarization orientation in the second subframe includes driving a zonal switchable waveplate between a first state and a second state,
wherein the zonal switchable waveplate outputs the first polarization orientation of the display light in the first state and outputs the second polarization orientation of the display light in the second state.

4. The method of claim 3, wherein the zonal switchable waveplate is disposed between a Pancharatnam-Berry Phase (PBP) grating and the corresponding display zone, wherein the PBP grating is configured to diffract the first polarization orientation at a first diffraction angle corresponding to the first direction, and wherein the PBP grating is configured to diffract the second polarization orientation at a second diffraction angle corresponding to the second direction, the first polarization orientation being opposite-handed of the second polarization orientation.

5. The method of claim 4, wherein the first diffraction angle is symmetrical to the second diffraction angle.

6. The method of claim 3, wherein the zonal switchable waveplate is disposed between a polarization volume hologram (PVH) and the corresponding display zone, wherein the PVH is configured to diffract the first polarization orientation to generate the shift in the optical path to the first direction, and wherein the PVH is configured to pass the second polarization orientation in the second direction, wherein the second polarization orientation is opposite-handed of the first polarization orientation.

7. A device comprising:
an eye-tracking system configured to detect a gaze angle of an eye of a user;
a display pixel array configured to generate display light;
a pixel dithering optical component configured to modulate the display light; and
processing logic configured to:
receive the gaze angle generated by the eye-tracking system;
identify a Field of View (FOV) in a foveated area corresponding to the gaze angle;
associate a corresponding display zone of the display pixel array that corresponds with the FOV in the foveated area; and
for the corresponding display zone, modulate the display light between a first polarization orientation in a first subframe and a second polarization orientation in a second subframe to shift an optical path of the display light in the corresponding display zone between a first direction and a second direction that is nonparallel to the first direction; and
shift, by an angular correction component, the display light in at least one of the first subframe and the second subframe such that the display light output from the angular correction component is parallel during each of the first subframe and the second subframe.

8. The device of claim 7, wherein the pixel dithering optical component includes a zonal switchable waveplate, wherein the processing logic is configured to drive a zone of the zonal switchable waveplate between a first state and a second state, wherein the zonal switchable waveplate outputs the first polarization orientation of the display light in the first state and outputs the second polarization orientation of the display light in the second state, the zone of the zonal switchable waveplate receiving the display light from the corresponding display zone.

9. The device of claim 8, wherein the pixel dithering optical component further includes a Pancharatnam-Berry Phase (PBP) grating, and wherein the PBP grating is configured to diffract the first polarization orientation at a first diffraction angle corresponding to the first direction, and wherein the PBP grating is configured to diffract the second polarization orientation at a second diffraction angle corresponding to the second direction.

10. The device of claim 9, wherein the PBP grating comprises a first PBP grating and the angular correction component comprises a second PBP grating of the pixel dithering optical component, the second PBP grating configured to angularly correct output light generated by the first PBP grating, wherein the first PBP grating is disposed between the second PBP grating and zonal waveplate.

11. The device of claim 8, wherein the pixel dithering optical component further includes a polarization volume hologram (PVH), and wherein the PVH is configured to diffract the first polarization orientation to generate the shift in the optical path to the first direction, and wherein the PVH is configured to pass the second polarization orientation in the second direction, wherein the second polarization orientation is opposite-handed of the first polarization orientation.

12. The device of claim 11, wherein the PVH comprises a first PVH and the angular correction component comprises a second PVH of the pixel dithering optical component, the second PVH configured to angularly correct the first polarization orientation and pass the second polarization orientation.

13. The device of claim 8, wherein zonal switchable waveplate is a zonal switchable half-waveplate having zones of the zonal switchable half-waveplate overlaying corresponding display zones of the display pixel array.

14. The device of claim 7, wherein the pixel dithering optical component further includes:

a liquid crystal layer; and a zonal polarization control layer disposed between the display pixel array and the liquid crystal layer, wherein the display light is in a first linear polarization orientation, and wherein the zonal polarization control layer includes zones overlaying corresponding display zones of the display pixel array, wherein a zone of the zonal polarization control layer is driven to a first state to pass the display light having the first linear polarization orientation, and wherein the zone of the zonal polarization control layer is driven to a second state to change the first linear polarization orientation to a second linear polarization orientation, and wherein the liquid crystal layer shifts an optical path of the second polarization orientation but not the first polarization orientation.

15. The device of claim 14, wherein the liquid crystal layer is a polymerized liquid crystal film having liquid crystals disposed in a fixed orientation.

16. The device of claim 7, wherein the pixel dithering optical component further includes a zonal liquid crystal layer including zones overlaying corresponding display zones of the display pixel array, wherein a zone of the zonal liquid crystal layer is driven to a first state to pass the display light having a first linear polarization orientation, and wherein the first state of the zonal liquid crystal layer aligns liquid crystal molecules within the zone to have an optics axis that is parallel to the first linear polarization orientation of the display light, wherein the zone of the zonal liquid crystal layer is driven to a second state to laterally shift an optical path of the display light having the first linear polarization orientation, and wherein the second state of the zonal liquid crystal layer aligns liquid crystal molecules within the zone to have the optics axis that is not perpendicular and not parallel to the first linear polarization orientation of the display light.

17. A display comprising:

a display pixel array configured to generate display light;

a pixel dithering optical component configured to modulate the display light; and processing logic configured to drive the pixel dithering optical component to:

modulate the display light between a first polarization orientation in a first subframe and a second polarization orientation in a second subframe to shift an optical path of the display light emitted by a display zone of the display pixel array between a first direction and a second direction that is nonparallel to the first direction, the display pixel array including a plurality of display zones; and shift, by an angular correction component, the display light in at least one of the first subframe and the second subframe such that the display light output from the angular correction component is parallel during each of the first subframe and the second subframe.

18. The display of claim 17, wherein modulating the display light to shift the optical path of the display light provides a perceived doubling of a pixel resolution in the display zone while remaining display zones in the plurality of display zones still have a perceived pixel resolution consistent with a density of pixels in the display pixel array.

19. The display of claim 17, wherein the processing logic is further configured to:

receive gaze data from an eye-tracking system; and modulate one or more zones in the pixel dithering optical component in response to the gaze data, wherein modulating the one or more zones of the pixel dithering optical component increases a perceived resolution of the display pixel array in a display zone corresponding to the one or more zones of the pixel dithering optical component that are being modulated.

20. The display of claim 17, wherein the pixel dithering optical component includes a zonal switchable waveplate having zones, and wherein individual zones of the zonal switchable waveplate are configured to be switched by the processing logic to shift the optical path of the display light.

* * * * *